United States Patent

Clay

[11] 3,762,068
[45] Oct. 2, 1973

[54] FLANGE LEVELING DEVICE

[76] Inventor: Gilbert N. Clay, 6576 White Doe Trl., Rockford, Ill. 61102

[22] Filed: June 21, 1971

[21] Appl. No.: 154,997

[52] U.S. Cl............ 33/180 R, 33/372, 85/3 S, 248/216
[51] Int. Cl.............. G01c 9/28, F16b 19/00
[58] Field of Search............ 33/180 R, 286, 174 N, 33/369, 370, 371, 372, 373, 379, 384; 248/216, 220.5, 281; 269/48.1, 52; 85/3 R, 3 S

[56] References Cited
UNITED STATES PATENTS

| 1,421,768 | 7/1922 | Egbert et al. | 85/3 S |
| 2,246,834 | 6/1941 | Bowman | 85/3 S |
| 2,531,799 | 11/1950 | Zumwalt | 248/216 |
| 2,746,163 | 5/1956 | Moritz | 33/370 |

Primary Examiner—Robert B. Hull
Assistant Examiner—Richard R. Stearns
Attorney—Mosbach, Pillote & Muir

[57] ABSTRACT

A flange leveling device for determining the position of bolt holes in a pipe flange and the like in which the leveling device has a body with a level indicator and a pair of flange hole engaging units mounted on the body for adjustment toward and away from each other to accommodate different flange hole spacing. Each flange hole engaging unit includes a guide member having a passage extending therethrough, a cone face at one end of the guide member, a plunger slidable in the passage in the guide member and having a toggle movable from an inoperative position to an operative position extending crosswise of the plunger for clamping a pipe flange between the toggle and cone face to center the guide member in the flange holes.

7 Claims, 3 Drawing Figures

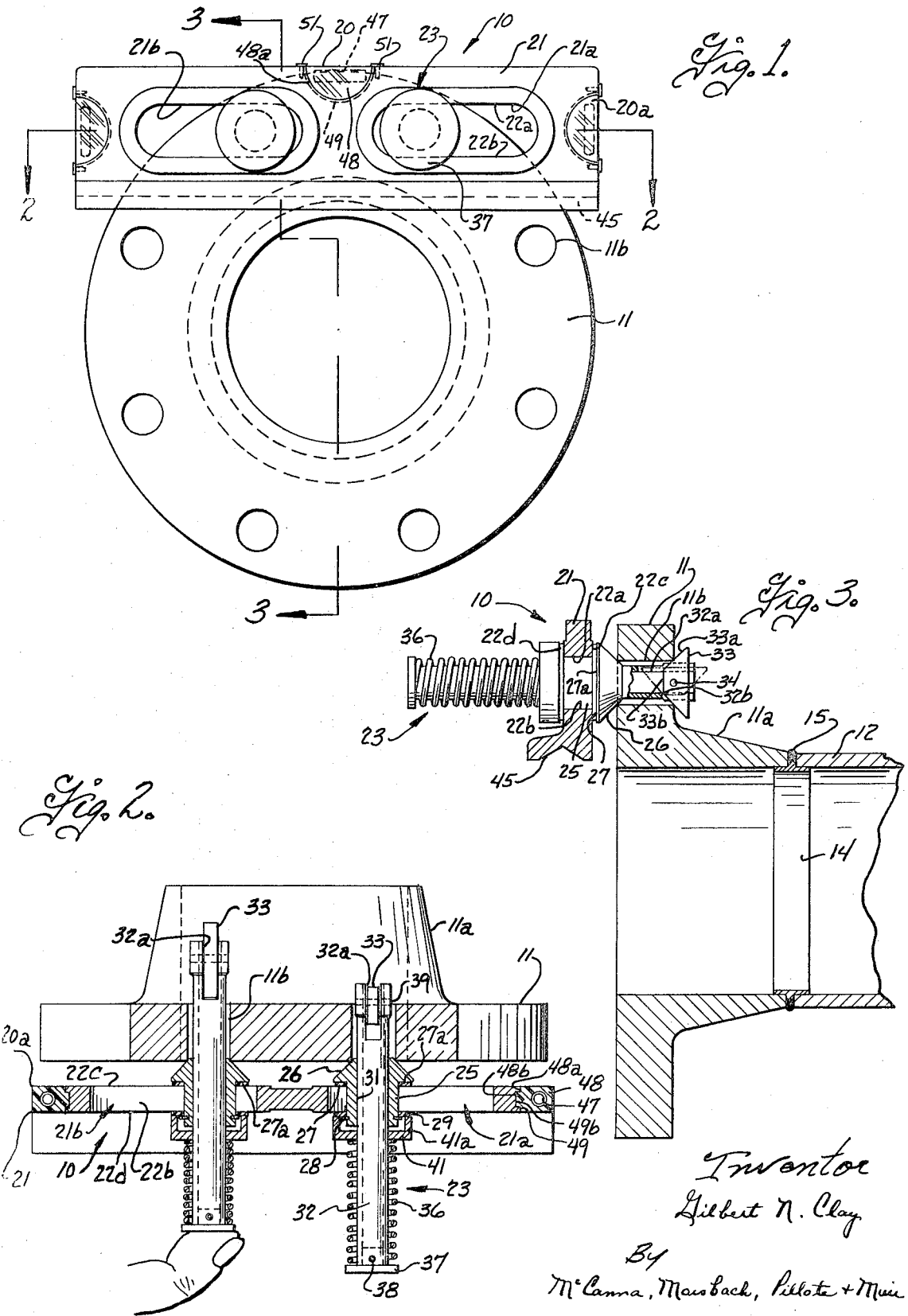

FLANGE LEVELING DEVICE

BACKGROUND OF INVENTION

In the fabricating of flange joints and pipes, it is necessary to position the pipe flange so that its bolt holes will properly align with the bolt holes of a mating flange of a second pipe or item of equipment. This adjustment is very important when a flanged fitting such as an elbow, a T, a flanged valve, or a flanged item of equipment is to be attached to the pipe flange since a slight inaccuracy in the rotational position of the flange bolt holes will result in an undesirable change in direction of all subsequent piping, or in an inaccurately positioned item of equipment. In order to properly position the flange for welding, it is customary to position a level across two selected bolt holes in the flange and to rotate the flange until the line connecting the centers of the bolt holes coincides with a horizontal reference plane. Proper leveling of the selected flange holes requires accurate positioning of the level with relation to the center of the flange holes. However, the size of the flange holes and the flange hole spacing varies with different size flanges.

It has heretofore been proposed to make flange hole leveling devices with flange hole engaging units in the form of stepped plugs, the outer diameter of the steps of the plugs corresponding to the different size holes in the different size flanges. Such plugs, however, must be dimensioned sufficiently smaller than the flange holes to be readily insertable and removable therefrom, considering tolerance variations in the size of the flange holes. There is, accordingly, some clearance between the plugs and the flange holes when the plugs are inserted into the flange holes which affects the accuracy of the leveling operation. Moreover, such stepped plugs do not function to clamp the leveling device to the flange. It has also been proposed to use flange hole engaging units in the form of pairs of separable cone elements which are assembled through a flange hole from opposite sides of the flange to provide a support for the level device. The use of separable elements, however, not only complicates use of the leveling device due to the necessity of handling a multiplicity of separate parts, but also increases the likelihood of loss of some parts.

SUMMARY OF THE INVENTION

It is the general object of the present invention to provide a leveling device having flange hole engaging units adapted to firmly clamp the leveling device to a flange in centered relation to the selected flange holes.

Another object of this invention is to provide a flange leveling device which can be readily installed and removed from a flange from a position at the face side of the flange.

Still another object of this invention is to provide a flange leveling device which is adapted for use on flanges of different size having different size flange holes and different flange hole spacing.

An important feature of the present invention resides in the provision of a flange leveling device in which the flange engaging units include a member having a cone face at one end adapted to engage a flange at one end of a flange hole to center the member therein, a plunger coaxially slidable relative to the guide member for passage through the flange hole, and a toggle on the plunger engageable with the flange at the other end of the hole for clamping the hole engaging unit to the flange in concentric relation with the flange hole.

Another feature of the present invention resides in an improved arrangement for mounting the flange hole engaging units on a level body for adjustment toward and away from each other and wherein the level body is yieldably pressed against a thrust shoulder at the rear side of the cone face to maintain the level body perpendicular to the cone face while allowing adjustment of the hole engaging members relative to the level body.

These, together with other objects and features of the present invention will be more readily understood from the following description when taken in connection with the accompanying drawings wherein:

FIG. 1 is an elevational view of the flange leveling device shown mounted on the face of a flange;

FIG. 2 is a horizontal sectional view taken on the plane 2—2 of FIG. 1; and

FIG. 3 is a vertical sectional view taken on the plane 3—3 of FIG. 1.

The flange leveling device 10 of the present invention is generally adapted for use in positioning flanged fittings for pipes and the like so that the flange bolt holes will properly align with the bolt holes of a mating flange of a second pipe or item of equipment such as an elbow, a T, a flanged valve or other flanged item of equipment. In the accompanying drawings, the leveling device is shown applied to a welding neck flange in which the flange 11 has an integral neck 11a which is adapted to be butt welded to the end of a pipe 12. It is to be understood, however, that the leveling device can be used with other types of flanges such as the slip-on flanges in which the flange opening telescopes over the flange; socket welding flanges in which the flange is formed with a socket for receiving the end of the pipe, screwed flanges, etc., as well as flanges used on other items of equipment. The flanges 11 are customarily formed with a plurality of bolt holes 11b, the number, diameter and spacing of which bolt holes varies with different size flanges. In order to properly position the pipe flange, the leveling device is positioned in a selected pair of bolt holes, herein shown as the upper pair of bolt holes. In use, the flange is turned after the leveling device is mounted on the flange until the line connecting the centers of the selected bolt holes coincides with a selected reference plane. Any conventional arrangement can be utilized to maintain the flange 11 concentric with the pipe and, as shown in FIG. 3, a welding ring 14 is disposed within the adjacent ends of the flange 11 and pipe 12 to not only aid in maintaining the pipe and flange in concentric relation, but to also space the adjacent ends for welding as diagrammatically indicated at 15.

The flange leveling device includes an elongated body member 21 having level indicating means 20 thereon and a pair of flange hole engaging units 23 mounted on the level body for adjustment toward and away from each other to accommodate different flange hole spacing. The flange hole engaging units extend through openings formed in the level body and at least one and preferably both of the openings designated 21a, 21b are in the form of elongated slots having their major axes aligned to allow adjustment of the flange hole engaging units toward and away from each other along a path having a fixed relation to the reference plane of the level indicator 20. While the slots 21a, 21b are herein shown separated from each other, it is to be understood that the slots could be formed as a continuous slot if desired. The slots 21a, 21b each define opposed relatively parallel guide walls 22a, 22b and relatively parallel guide faces 22c and 22d at opposite sides of the body 21.

The flange hole engaging units 23 are preferably of like construction and like numerals are used to designate corresponding parts. As best shown in FIGS. 2 and 3, the flange hole engaging units each include a guide member 25 having an outer wall portion which is guidably received between the opposed parallel guide faces 22a, 22b on the body member 21. The outer wall portion of the guide member is herein shown as having a circular cross section, it being understood that it could be noncircular, that is it could have flats which slidably and nonrotatably engage the guide walls 22a, 22b. The guide members have a rim portion at one end formed with a cone face 26 at its outer or forward side adapted to engage a flange about a flange hole 11b to center the guide member relative to the flange hole, and a thrust face 27 at its other or rear side disposed perpendicular to the axis of the cone face 26 and in overlying relation to the guide face 22c on the body member. The guide member is preferably formed of a relatively hard material, for example hardened steel to minimize deformation of the cone face during use and, in order to minimize frictional resistance to adjustment of the guide members along the body member 21, a thrust washer 27a formed of a friction reducing material is advantageously interposed between the thrust face 27 and the side face 22c on the body member. The thrust washer 27a can be formed of any suitable bearing material and may, for example, be formed of a plastic such as nylon, polytetrafluoroethylene, etc. A collar 28, herein shown in the form of a split ring disposed in a groove on the guide member 25, is provided at the other end of the guide member to retain the guide member on the body member 21. A thrust washer 29 conveniently similar to the washer 27a, is preferably interposed between the collar 28 and the face 22d on the body member.

The guide members 25 have a passage 31 extending therethrough coaxial with the cone face 26 and a plunger 32 slidably extends through the guide member. The forward end portion of the plunger 32 is dimensioned to pass through the bolt holes 11b in the flange and a toggle 33 is pivotally mounted on the forward end of the plunger for movement between an inoperative position in which the toggle extends generally lengthwise of the plunger, as shown at the left in FIG. 2, and an operative position in which the toggle extends crosswise of the plunger as shown at the right in FIG. 2 and in FIG. 3. The toggle 33 is herein shown in the form of a generally flat member which is disposed in a slot 32a in the end of the plunger and which is pivotally mounted by a pin 34 on the plunger. The pin 34 is located intermediate the ends of the toggle 33 and, when the latter is in its position extending crosswise of the plunger, the toggle is shaped to provide flange engaging faces 33a disposed in opposed relation to the cone face 26 on the guide member and which diverge outwardly to engage the flange at the side opposite the cone for locking the leveling device to the flange and for centering the leveling device with relation to the bolt holes. The slot 32a in the plungers are preferably formed in such a manner as to provide a stop face 32b (FIG. 3) engageable with the toggle when it is in its crosswise extending position as shown in FIG. 3, and also when the toggle is in its lengthwise extending position, to limit movement of the toggle between the aforementioned positions. In the form shown, the plunger 32 is formed of tubular stock and the inner wall thereof is arranged to engage a face 33b on the toggle, when the toggle extends lengthwise of the plunger.

The plungers 32 also have portions extending rearwardly from the guide members 25 and the plungers are yieldably urged in a direction to retract the toggles 33 toward the cone faces 26 on the guide members to clamp the pipe flange therebetween. As shown in FIGS. 2 and 3, a coil spring 36 is disposed around the rear end portion of the plunger and engages a head 37 on the rear end of the plunger to yieldably urge the plunger to a retracted position. The head 37 is conveniently detachably connected to the plunger as by a pin 38 to facilitate assembly of the units and, as will be understood from the following description, the heads 37 are also utilized as operating knobs by which the plungers are manually depressed for insertion through the flange holes. In order to prevent accidental detachment of the plungers from the guide members 25, a stop means is provided for limiting retraction of the plungers. As shown, the plungers are formed with an enlarged end portion 39 which is arranged to engage the guide bushing to limit retraction of the plunger out of the guide member.

The spring 36 is also advantageously so arranged as to press the body member 21 against the thrust washer 27a and thrust face 27 on the guide member, to maintain the plane of the body member normal to the hole engaging units while permitting free adjustment of the hole engaging units relative to the guide member. For this purpose, a thrust collar 41 slidably surrounds the plunger 32 and has a forwardly extending rim 41a that loosely surrounds the end of the guide member 25 and the locking ring 28 and engages the thrust washer 29 in an area outwardly of the locking ring to directly press the thrust washer 29 against the guide face 22d. Thus, the reaction of spring 36 is transmitted through collar 41 and thrust washer 29 to the body member 21 to yieldably press the same against the thrust washer 27a at the rear side of the cone face 26. Moreover, it will be seen that when the plungers are in their retracted position, as occurs prior to installation, the springs apply a relatively lighter pressure to the thrust washer 29, to allow free adjustment of the hole engaging units relative to the body 21, and when the plungers are thereafter extended and the toggles manipulated to effect clamping of the level device to the flange, the springs 36 are compressed to a greater degree so as to more firmly press the level body against the thrust washer 27a and thrust face 27.

The level device is also advantageously arranged so as to facilitate horizontal and vertical leveling of pipes. For this purpose, the level body member 21 is provided with a groove 45 (FIG. 3) along one longitudinally extending edge, to facilitate centering of the lengthwise axis of the level on a pipe or other cylindrical object. As shown in FIG. 1, longitudinal and cross level indicators 20 and 20a respectively are provided at the sides and ends of the level body.

While the level indicators 20, 20a can be of any desired construction, an improved level indicator is shown in the accompanying drawings. In general, the level indicators include a vial of conventional construction and having a longitudinally arched configuration and partially filled with fluid to form a bubble type level. The vials 47 are embedded in a transparent body of plastic or the like indicated at 48, which body has a semicylindrical marginal wall 48a received in a semicylindrical recess 49 in the body member 21. The plastic bodies 48 have a medial rib or key 48b on the wall 48a which fit into complementary groove 49b in the respective recesses 49 in the body member 21 to laterally retain the body 48 in position. Adjustable fasteners or screws 51 are threaded into the body member 21 at opposite ends of the arcuate slot 49 and have heads overlying the ends of the semicylindrical body 48 and, preferably, the threaded shanks of the screws engage the ends of the plastic bodies 48 to aid in holding them in adjusted position. The screws 51 can be tightened or loosened at opposite ends of the body 48 to angularly adjust the position of the level indicator.

From the foregoing it is thought that the construction and operation of the flange leveling device will be readily understood. In use, the flange hole engaging units 23 remain attached to the body member 21 at all times and are relatively adjustable toward and away from each other to accommodate different hole spacing. In mounting the leveling device on a flange, the body member can be engaged at its opposite ends with the forefingers overlying the front side of the body member 21 and with the thumbs applied to the heads 37 to both support the leveling device and to depress the plungers. After the plungers have been depressed and inserted through the flange hole, one of the forefingers can be manipulated to flip the toggle 33 into its crosswise position and the plunger then released to firmly clamp the leveling device to the flange. If desired, the toggle can be maintained vertical and can be weighted or otherwise unbalanced so as to normally swing to the crosswise position to thereby facilitate mounting of the leveling device on the flange.

Since the spring pressure is applied through the thrust washer 29 directly to the body member, it operates to press the body member forwardly against the thrust washer 27a and thrust face 27 at the rear side of the cone face 26 to thereby maintain the body member normal to the axis of the guides and plunger. The cone faces on the guide members function to reliably and accurately center the hole engaging units in the flange holes so as to facilitate accurate leveling of the flange holes.

While a preferred embodiment of the invention has been herein described for purpose of illustrating the invention, it is obvious that numerous changes may be made in the form, construction and arrangement of the several parts without departing from the scope of the invention or from the scope of the appended claims.

The embodiments of the invention in which an exclusive property or privilege is claimed are defined as follows:

1. In a flange level for determining the position of a pair of bolt holes in a flange, the level including a body member having front and rear sides and a level indicator thereon, a pair of flange hole engaging units, and means mounting the flange hole engaging units on the body member for relative adjustment toward and away from each other to accommodate different flange hole spacings, the improvement wherein said flange hole engaging units each include a guide member having a guide passage therethrough normal to said front and rear sides of the body member and a forwardly converging cone face on its forward end around the guide passage, a plunger slidably extending through each guide passage and having a forward end portion dimensioned to pass through a flange hole and extending axially forwardly from said cone face, a toggle pivotally mounted intermediate its ends on said one end of each plunger for movement relative thereto between a first position extending generally lengthwise of the plunger for passage through a flange hole and a second position extending crosswise of the plunger in opposed relation to the cone face, each toggle having flange engaging faces shaped to diverge forwardly from the associated plunger when the toggle is in said second position, said plungers each having a rear end portion extending rearwardly from said rear side of the body member, and means yieldably urging each plunger axially relative to the associated guide member in a rearward direction to retract the toggle thereon toward the associated cone face.

2. A flange level according to claim 1 wherein said body member has elongated slot means extending therethrough defining guideways, at least one of the guide members slidably extending through said slot means for adjustment toward and away from the other guide member.

3. A flange level according to claim 2 wherein each guide member has a rearwardly facing thrust face on said forward end thereof overlying said front side of said body member along said slot means, a thrust collar surrounding the rear end portion of each plunger and movable axially relative to the plunger and guide member and having a forwardly facing thrust face overlying the rear side of the body member along said slot means, a head on the rear end portion of each plunger, said yieldable means comprising a coil spring surrounding said rear end portion of each plunger and having one end engaging the associated thrust collar and the other end positively engaging the associated plunger to yieldably press said thrust collar forwardly against the rear side of said body member while yieldably urging said plunger rearwardly toward a retracted position.

4. A flange level for determining the position of a pair of bolt holes in a flange comprising, a body member having front and rear sides and elongated guide slots extending therethrough from the front to the rear side, a pair of guide members guidably received in said guide slots for adjustment toward and from one another, each guide member having a guide passage extending therethrough normal to said front and rear sides and a forwardly converging cone face surrounding the associated guide passage and forming a rim defining a rearwardly facing thrust face overlying said front side of the body member alongside the guide slot, a plunger slidably extending through the guide passage in each guide member and having a forward end portion extending axially forwardly from the cone face on the guide member and dimensioned to pass through a flange hole, a toggle on said forward end portion of each plunger movable from a first position extending generally lengthwise of the associated plunger to a second position extending crosswise of the plunger, each plunger having a rear end portion extending rearwardly from the rear side of the body member, a thrust collar slidable on said rear end portion of each plunger and having a thrust face overlying said rear side of said body member, and a coil spring on said rear end portion of each plunger having one end engaging said thrust collar and the other end positively engaging the associated plunger for yieldably urging said thrust collar forwardly toward said body member and for yieldably urging the plunger in a rearward direction to retract the toggle toward the associated cone face, and a level indicator on said body member.

5. A flange level according to claim 4 wherein said toggle members are each pivotally mounted intermediate their ends on the associated plunger and have flange engaging faces shaped to diverge forwardly from the plunger when the toggle is in said second position.

6. A flange level according to claim 6 wherein said plungers have a slot therein for receiving said toggle members and first and second stop faces on the plungers engageable with the toggle members in said first and second positions thereof.

7. A flange level according to claim 5 including a thrust washer extending around each guide member and engaging said rear side of the body member alongside said guide slots, said thrust face on each of said thrust collars engaging the associated thrust washer adjacent the outer periphery thereof, and means on each guide member engaging said thrust washer inwardly of the portion engaged by the associated thrust collar for retaining the guide member on the body member.

* * * * *

PO-1050
(5/69)

UNITED STATES PATENT OFFICE
CERTIFICATE OF CORRECTION

Patent No. 3,762,068      Dated October 2, 1973

Inventor(s) Gilbert N. Clay

It is certified that error appears in the above-identified patent and that said Letters Patent are hereby corrected as shown below:

Column 7, line 12, "claim 6" should be -- claim 5 --.

Column 8, line 4, "Claim 5" should be -- claim 4 --.

Signed and sealed this 5th day of February 1974.

(SEAL)
Attest:

EDWARD M. FLETCHER, JR.　　　　　RENE D. TEGTMEYER
Attesting Officer　　　　　　　　Acting Commissioner of Patents